J. HERNBY.
Cultivator.
No. 1,031.
Patented Dec. 10, 1838.
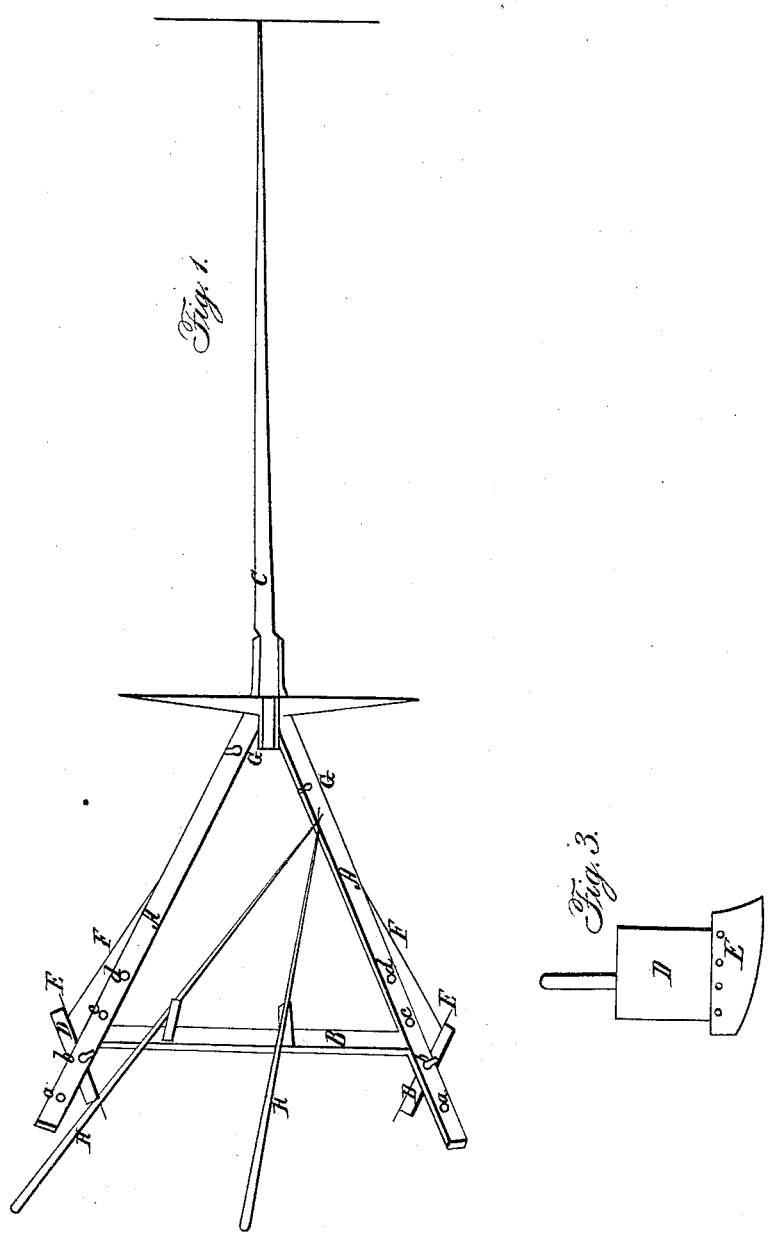
Witnesses:
Sam'l Dale
Inventor:
John Hernby

UNITED STATES PATENT OFFICE.

JOHN HERNLY, OF EAST HEMPFIELD, PENNSYLVANIA.

IMPROVEMENT IN CORN-PLOWS.

Specification forming part of Letters Patent No. 1,031, dated December 10, 1838.

*To all whom it may concern:*

Be it known that I, JOHN HERNLY, of East Hempfield township, in the county of Lancaster and State of Pennsylvania, have invented a new and useful Improvement in the Plowing and Dressing of Corn, called "Hernly's Corn-Plow;" and I do hereby declare that the following is a full and exact description.

A triangular frame, A A and B, Figures 1 and 2, is made of three pieces of timber of about three inches by five inches in thickness. The two side pieces are about four and a half feet long, the other or end beam about three feet four inches. A tong, C, Figs. 1 and 2, is inserted in the frame at the point in front where these side pieces meet, in the same manner as the tongue and hounds of a wagon are fixed. Near to the hind end of those side pieces a piece of wood is inserted into each from beneath of about a foot long and of nearly the same width and about two inches thick, which are called the "mold-boards" D, Figs. 1, 2, and 3. They are let in by a round tenon, so that they may be turned on the tenon when occasion requires. They are secured by pins through the end of the tenon, and kept firm by the iron rod F, hereinafter described.

Several bores may be made in the side pieces at different distances from the end, *a b c d*, Fig. 1, so that the mold-boards can be set forward or backward, according as the mold is to be thrown nearer to or farther from the corn-rows. On the inside of the lower end of these mold-boards is a plate of iron, extending below the mold-boards, called the "share," E, Figs. 1, 2, and 3, from one-fourth to one-half inch thick and from twelve to twenty-four inches in length, about seven to ten inches deep at the fore end, and about one-half of this depth at the hind end, having its lower edge turned a little inward. These shares are fastened upon the inner side of the mold-boards by screws, and may be moved farther front or back by changing the place of the screws. An iron rod, F, Figs. 1 and 2, is fastened to the fore side of each mold-board and running up through the side pieces in an angling direction toward the fore end thereof, with a screw at top, as at G, Figs. 1 and 2, by means of which rod the mold-boards and shares can be turned more in a line with the furrow, making it narrow, or more across the furrow, making it wider, thus bringing less or more ground to the corn-row. By placing the mold-boards in the proper holes in the beams and regulating them by the screw-rods two furrows can be made at one time and in fine order for planting corn.

Two handles—one near the center of the hind or end beam, the other above the left-hand side, H—enable the farmer to walk in the furrow and manage his plow while one share runs on each side of the row. This plow is drawn by two horses, and is fastened to the helms of each by a cross-bar at the point of the tongue. It can be accommodated to one horse. By means of the tongue so fastened and these handles the plowman may direct his plow at pleasure.

What I claim as my invention, and desire to secure by Letters Patent, is—

The peculiar manner of constructing, affixing, and connecting the mold-boards so as to admit of their being shifted and turned so as to regulate the distance apart and the breadth of the furrows, as herein described.

JOHN HERNLY.

Witnesses:
SAML. BOMBERGER,
SAML. DALE.